United States Patent [19]
Ikami et al.

[11] Patent Number: 5,675,509
[45] Date of Patent: Oct. 7, 1997

[54] DATA TRANSMISSION DEVICE

[75] Inventors: Kazunori Ikami; Yasuhiro Funahashi, both of Nagoya; Yukie Hasegawa, Kasugai, all of Japan

[73] Assignee: Brother Kogyo Kabushiki Kaisha and Xing, Inc., Aichi-Ken, Japan

[21] Appl. No.: 441,876

[22] Filed: May 16, 1995

[30] Foreign Application Priority Data

May 17, 1994 [JP] Japan .................. 6-102886

[51] Int. Cl.$^6$ .................. G06K 15/00; H04N 7/10; H04J 3/16
[52] U.S. Cl. .................. 364/514 C; 370/437; 348/7
[58] Field of Search .................. 364/514 A, 514 C; 370/95.1, 95.3, 85.7, 93, 437, 442, 449, 458; 348/7, 12, 13; 455/4.2; 365/189.02, 189.01

[56] References Cited

U.S. PATENT DOCUMENTS

| | | | |
|---|---|---|---|
| 5,181,107 | 1/1993 | Rhoades | 358/86 |
| 5,440,336 | 8/1995 | Buhro et al. | 348/13 |
| 5,487,035 | 1/1996 | Nishimura et al. | 365/189.02 |
| 5,548,281 | 8/1996 | Funahashi et al. | 340/825.08 |

Primary Examiner—Hassan Kizou
Assistant Examiner—A. Bnimoussa
Attorney, Agent, or Firm—Oliff & Berridge

[57] ABSTRACT

Each of the data transmission devices 15a–15d serially and cyclically transmits all the song data over a corresponding channel, by a time cycle corresponding to the number of the song data. The four data transmission devices 15a–15d transmit the song data, at timings shifted from one another by (1/the number of channels) of the time cycle. Each terminal determines one channel out of the four channels that can most rapidly supply desired song data. Each terminal then picks up the desired song data from the determined channel.

13 Claims, 9 Drawing Sheets

DATA TRANSMISSION DEVICE

BACKGROUND OF THE INVENTION

1. Field of the Invention

The present invention relates to a data transmission system wherein a central control unit and a plurality of terminals are connected by a transmission line, the data transmission system being for transmitting information data from the central control unit to the terminals.

2. Description of the Related Art

Conventionally, there is known a data transmission system, wherein a center (central control unit) is connected to a plurality of terminals by a transmission line. The data transmission system is for transmitting information data including various types of information from a center to a terminal according to demands from the terminal side. An advantage of this type of data transmission system is that a memory device for prestoring data information need not be provided to each terminal, so that the terminals have an extremely simple construction.

SUMMARY OF THE INVENTION

A one-way data transmission system is conceivable in which the center serially and cyclically transmits a plurality of information data to the terminals. Each terminal monitors the incoming information data. When desired information data arrives, the terminal picks up the information data.

Assume now that this one-way transmission system is applied to a karaoke system for supplying karaoke song data to a plurality of terminals. The center repeatedly transmits a plurality of, for example 5,000 songs' worth of song data to the terminals, in succession. At a terminal, a user requests a song he or she desires to sing. When song data of the requested song arrives, the terminal picks up the song data and starts the karaoke performance accordingly.

According to this one-way transmission system, when the user requests a song immediately before the song data for the song arrives, the terminal can pick up that song data within a very short period of time. However, when the user requests the song immediately after its song data has been transmitted, the terminal must wait for the next time the song data arrives after song data for all the other songs have been transmitted. In this example, the terminal must wait until about song data for 5,000 songs have been transmitted. This long waiting time is inconvenient for the user.

A two-way transmission system is also conceivable, in which the terminal transmits a request to a center, whereupon the center transmits requested information data to the terminal. According to this two-way transmission system, the terminal can obtain desired information data within a short period of time.

However, the structure of two-way transmission systems is more complicated and needs more troublesome control processes than the one-way transmission systems. Additional control processes, such as traffic control processes, must be provided to prevent various defects inherent to the two-way transmission, for example, transmission error due to overflow of requests from terminals.

It is therefore an objective of the present invention to overcome the above-described problems and to provide an improved one-way data transmission system wherein a terminal can obtain desired information data within a short waiting time.

According to attain the objective and other objectives, the present invention provides a data transmission device for transmitting information data from a central control unit to a plurality of terminals via a transmission line, the data transmission device comprising: a central control unit; and a plurality of terminals connected to the central control unit via a transmission line, the transmission line having several channels, wherein the central control unit includes: information data memory means for storing a plurality of information data; and several data transmission means each for successively transmitting the plurality of information data via a corresponding channel of the transmission line cyclically at a predetermined cycle period, the transmission timings at which the several data transmission means transmit the information data being shifted from one another by a time period obtained by dividing the predetermined cycle period with the number of channels; and wherein each of the plurality of terminals includes: channel determination means for determining one channel of the several channels, over which a desired information data will be transmitted most immediately; and data pick up means for picking up the desired information data from the determined channel.

The channel determination means may include: data confirming means for confirming information data that are being presently transmitted over the respective channels; and time presumption means for presuming a time period required until the desired information data will be transmitted over the respective channels.

According to another aspect, the present invention provides a data transmission device for transmitting information data from a central control unit to a plurality of terminals via a transmission line, the data transmission device comprising: a central control unit; and a plurality of terminals connected to the central control unit via a transmission line, the transmission line having several channels, wherein the central control unit includes: information data memory means for storing a plurality of information data, the plurality of information data being divided into several information data groups, each of the information data groups consisting of several information data; and several data transmission means each for successively transmitting the several information data of a corresponding information data group via a corresponding channel of the transmission line cyclically; and wherein each of the plurality of terminals includes: channel determination means for determining one channel of the several channels, over which a desired information data will be transmitted and data pick up means for picking up the desired information data from the determined channel.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

A data transmission system according to preferred embodiments of the present invention will be described while referring to the accompanying drawings wherein like parts and components are designated by the same reference numerals as to avoid duplicating description.

Figure 1:
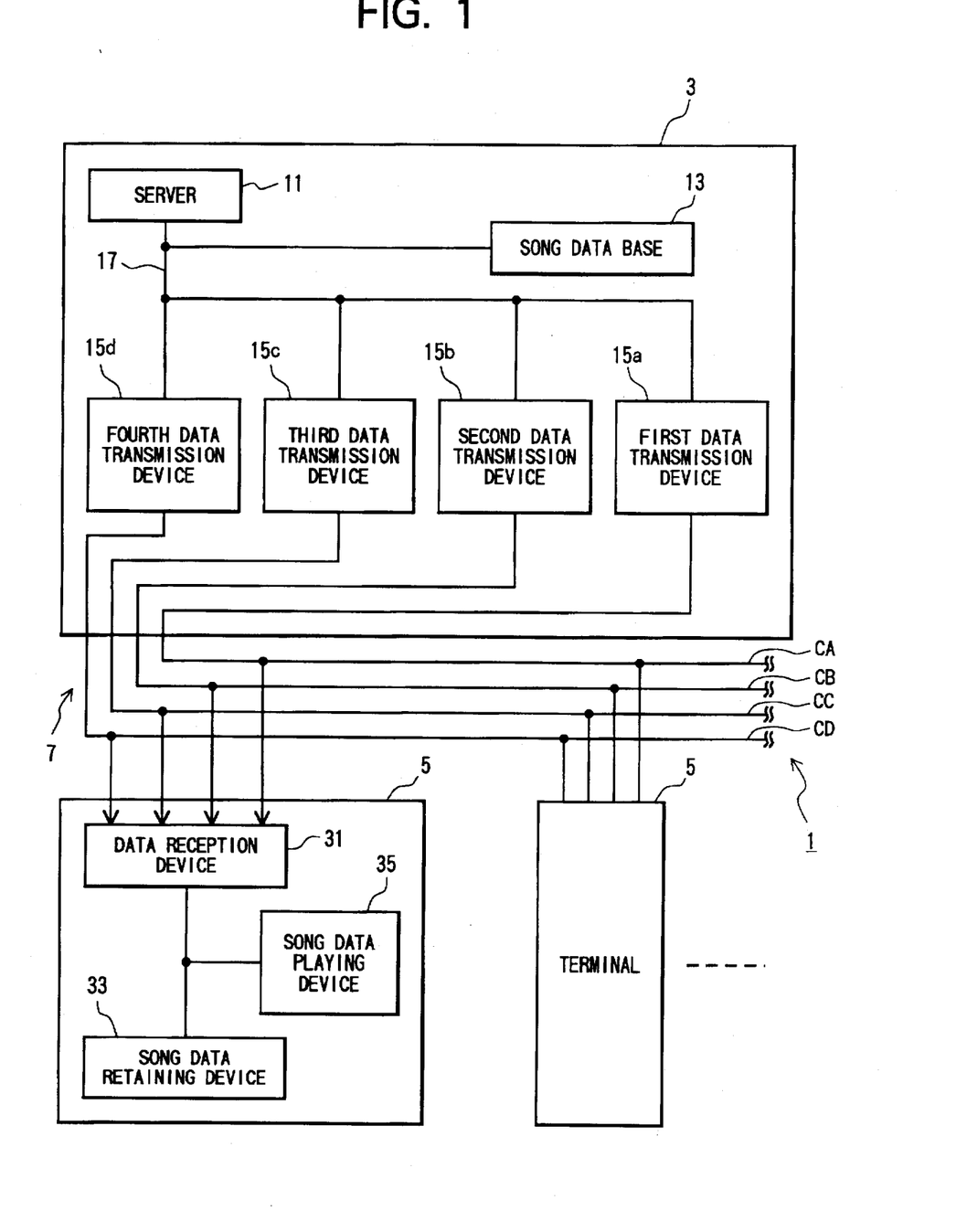
FIG. 1 is a block diagram schematically showing configuration of a data transmission system of first and second embodiments of the present invention.

First, a data transmission system of a first preferred embodiment of the present invention will be described with reference to FIGS. 1 through 9. The data transmission system of the embodiment is a karaoke system. As shown in FIG. 1, the karaoke system 1 according to the first embodiment is constructed from a center 3 connected to a plurality of karaoke terminals 5 by a coaxial cable 7 (transmission line). The karaoke terminals 5 can be provided in separate buildings or in separate establishments or booths within the same building. According to this karaoke system, when a user requests at one of the terminals a song he/she desires to sing, karaoke song data of the requested song and background image data appropriate for the requested song transmitted from the center are received and reproduced at the terminal. The terminal plays accompaniment music of the requested song while displaying the lyrics of the song and a background image behind the display of the lyrics.

The center 3 includes a server (control portion) 11; a song data base 13; and first through fourth data transmission devices 15a–15d. These elements are connected via a bus line 17.

The server 11 is for performing overall control of the center 3. The song data base 13 is constructed from a memory device of a large capacity, such as a hard disk or magnetooptic disks, and stores a plurality of songs worth of song data, For example, song data for K-number of songs are stored in the hard disk 26. The songs stored in the song base 13 are numbered from 1 to K.

Figure 2:
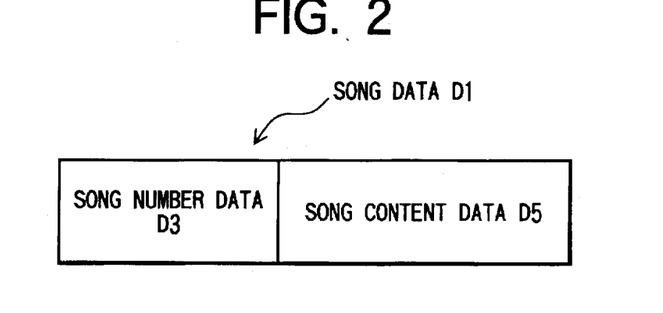
FIG. 2 illustrates configuration of one song's worth of song data.

As shown in FIG. 2, one song's worth of song data D1 is constructed from: song number data D3 indicative of the song number and song content data D5. The song content data DS includes: lyric data which will be projected on a monitor television 53 of a karaoke terminal 5 (to be described later); and instrumental accompaniment data which will be played by a sound source 45 of the karaoke terminal 5 (also to be described later.) The accompaniment data is MIDI (Musical instrument Digital Interface) standard data.

It is noted that newly released songs can be inputted to the song data base 13 directly or through a telephone line from a host computer.

The coaxial cable 7 connected between the center 3 and the plurality of terminals 5 has four channels CA, CB, CC, and CD. The first data transmission device 15a is designed to transmit data via the channel CA; the second data transmission device 15b via the channel CB; the third data transmission device 15c via the channel CC; and the fourth data transmission device 15d via the channel CD.

Each of the plurality of karaoke terminals 5 includes a data reception device 31, a song data retaining device 33, and a song data playing device 35. The data reception device 31 is for receiving song data transmitted from the center 3 via the coaxial cable 7. The song data retaining device 33 is for temporarily storing the song data received by the data reception device 31. The song data playing device 35 is for playing karaoke performance based on the song data retained in the song data retaining device 33.

Figure 3:
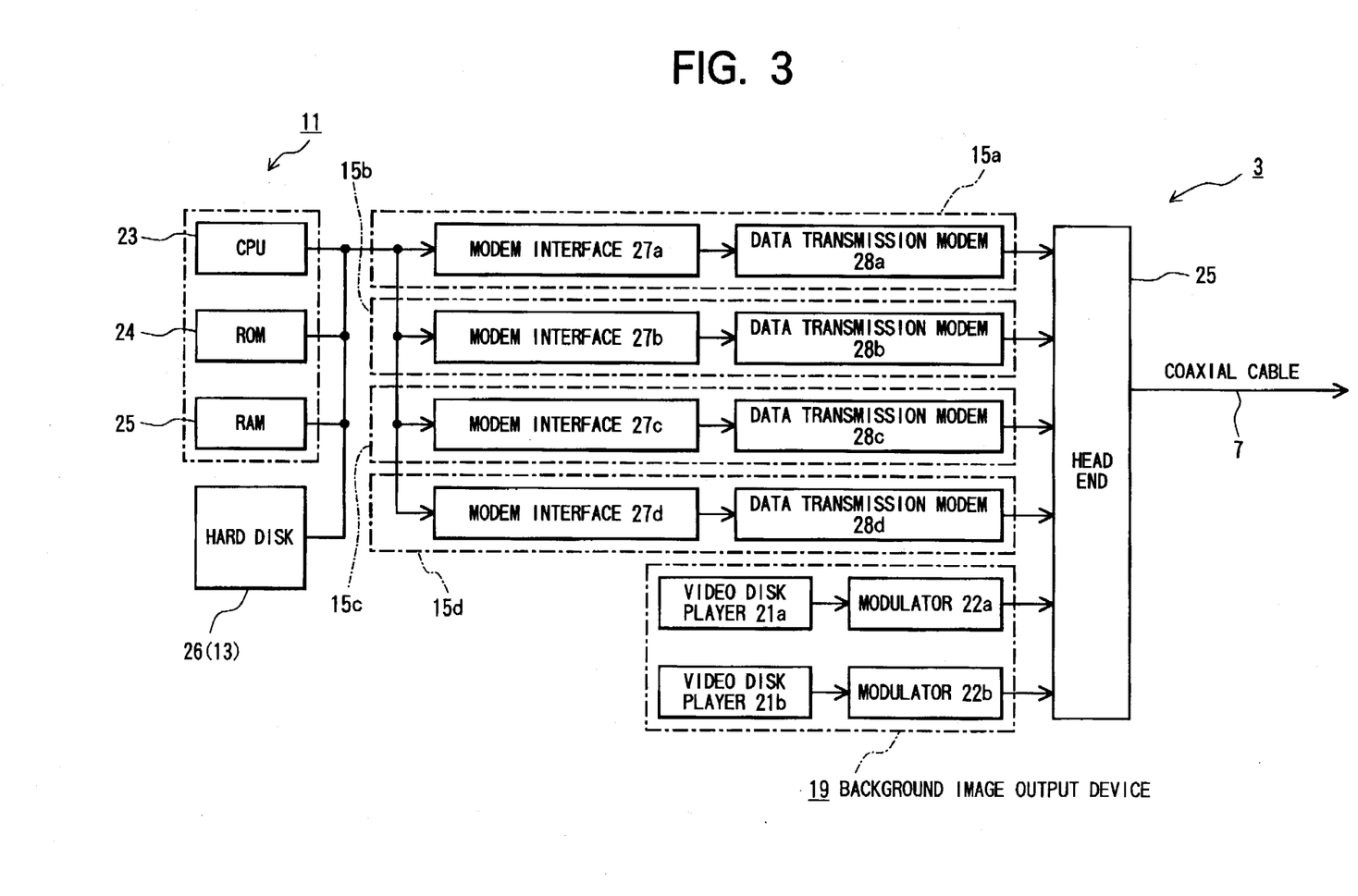
FIG. 3 is a block diagram of configuration of a concrete example of a center of the data transmission system of FIG. 1.

A concrete example of the karaoke system 1 of the present embodiment will be described below with reference to FIGS. 3 through 5. In this concrete example, the coaxial cable 7 includes channels CE and CF in addition to the four channels CA–CD.

First, the concrete example of the center 3 will be described while referring to FIG. 3.

According to the example, the server 11 includes a CPU 23, a ROM 24, and a RAM 25. A large-capacity hard disk 26 is provided as the song data base 13. Each of the four data transmission devices 15a–15d is constructed from a modem interface 27a–27d and a data transmission modem 28a–28d. The center 3 is further provided with a head end 25 and a background image output device 19.

Each of the modem interfaces 27a–27d is for transferring song data retrieved from the hard disk 26 to the corresponding data transmission modem 28a–28d. The data transmission modems 28a–28d are for modulating the received song data into radio frequency alternating current signals of corresponding channels (frequency bands) CA–CD. The data transmission modems 28a–28d output the thus modulated song data to the head end 25, which in turn transmits the song data over the channels CA–CD.

In the background image output device 19, two video disk players 21a and 21b are connected to two modulators 22a and 22b, respectively. The video disk players 21a and 21b are for outputting background image data (video signals according to standard National Television System Committee (NTSC) system) for projecting on a monitor television 53 of each karaoke terminal 5 (to be described later). The background image data is categorized according to genre of the karaoke songs requestable at the terminals 5. In this concrete example, one video disk player 21a houses video disks storing image data of images directed toward Japanese ballads (Enka), and the other video disk player 21b houses video disks storing image data of images directed toward popular songs. Each of the video disk players 21a and 21b continuously plays the video disks to output background image data. The modulators 22a and 22b modulate background image data from the video disk players 21a and 21b into radio frequency alternating current signals for the channels (frequency bands) CE and CF and output them to the head end 25.

The head end 25 includes a variety of devices (not shown) such as a mixer for mixing signals inputted thereto and for outputting the mixed signals to the coaxial cable 7. More specifically, song data, from the data transmission modems 28a–28d, and background image data which has been modulated into the different channel signals by the modulators 22a and 22b is imputted to the head end 25. The head end 25 multiplexes the plurality of different channel signals and transmits them over the coaxial cable 7, along which they are transmitted to the karaoke terminals 5.

Figure 4:
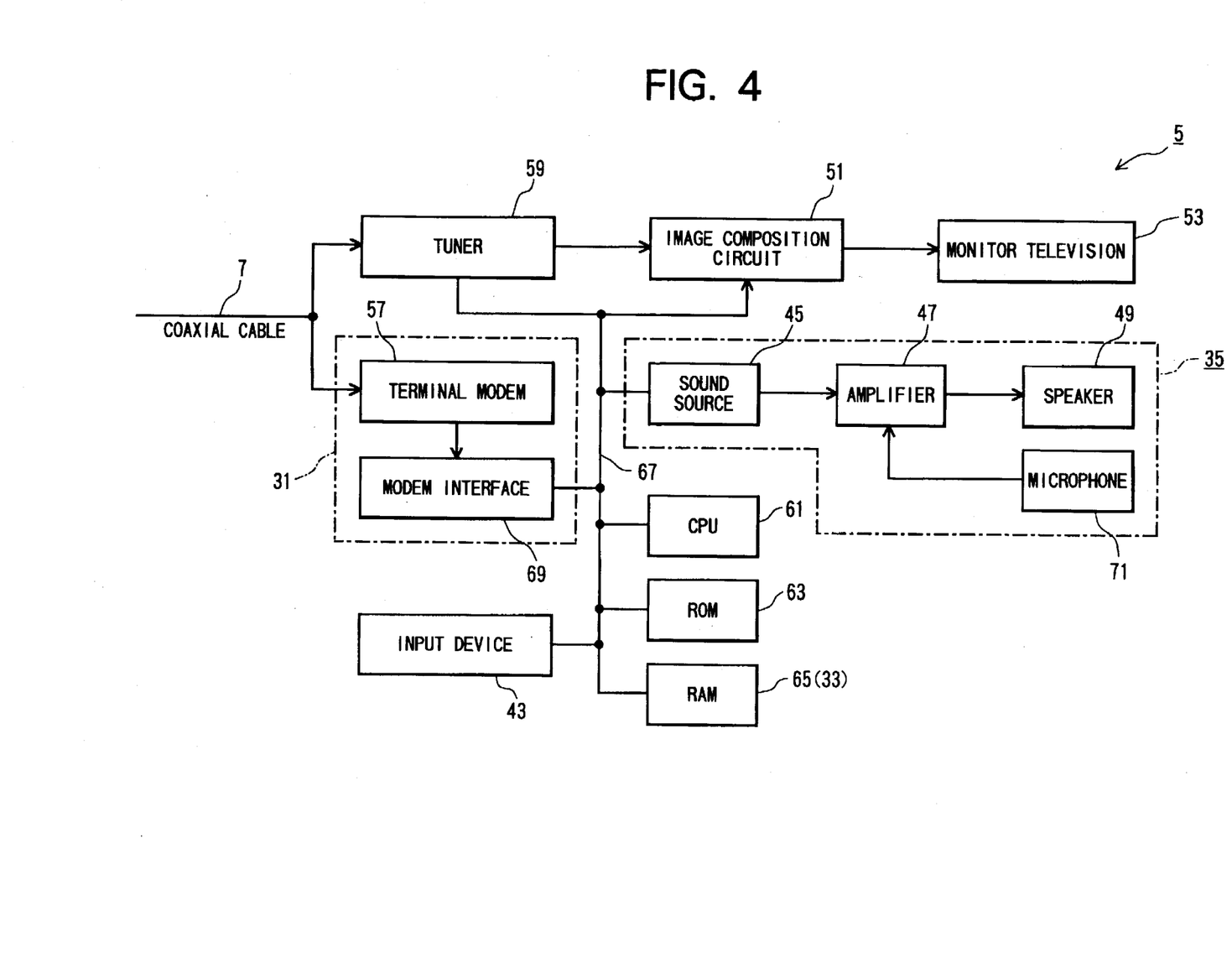
FIG. 4 is a block diagram of configuration of a concrete example of a terminal of the data transmission system of FIG. 1.
Figure 5:
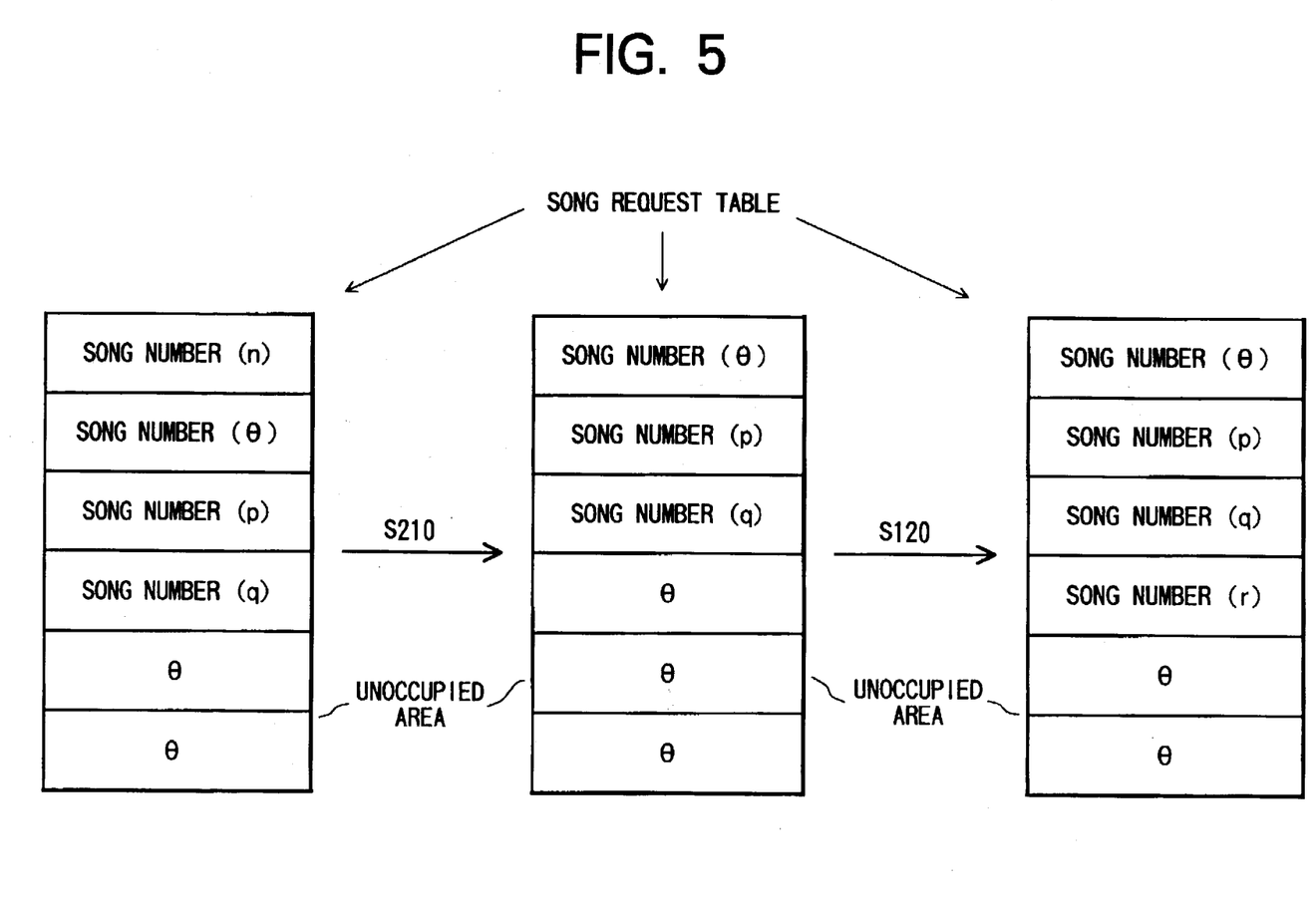
FIG. 5 shows how song numbers are stored in and retrieved from a song request table.

The structure of the concrete example of the karaoke terminal 5 will be provided while referring to FIG. 4.

In the concrete example, the data reception device 31 is constructed from a terminal modem 57 and a modem interface 69. The song data retaining device 33 is formed from a RAM 65. The song data playing device 35 is constructed from a sound source 45, an amplifier 47, a speaker 49, and a microphone 71. The terminal 5 further includes a CPU 61; a ROM 63; an input device 43; a tuner 59; an image composition circuit 51; and a monitor television 53. A busline 67 is provided for connecting the CPU 61, the ROM 63, the RAM 65, the input device 43, the modem interface 69, the sound source 45, the tuner 59, and the image composition circuit 51.

The input device 43 includes a variety of switches by which a user operates the karaoke terminal 5. The input device 43 includes a number pad (ten key) for inputting a song number of a user's requested karaoke song. The user can request any songs stored in the hard disk 26 of the center 3.

Figure 7:
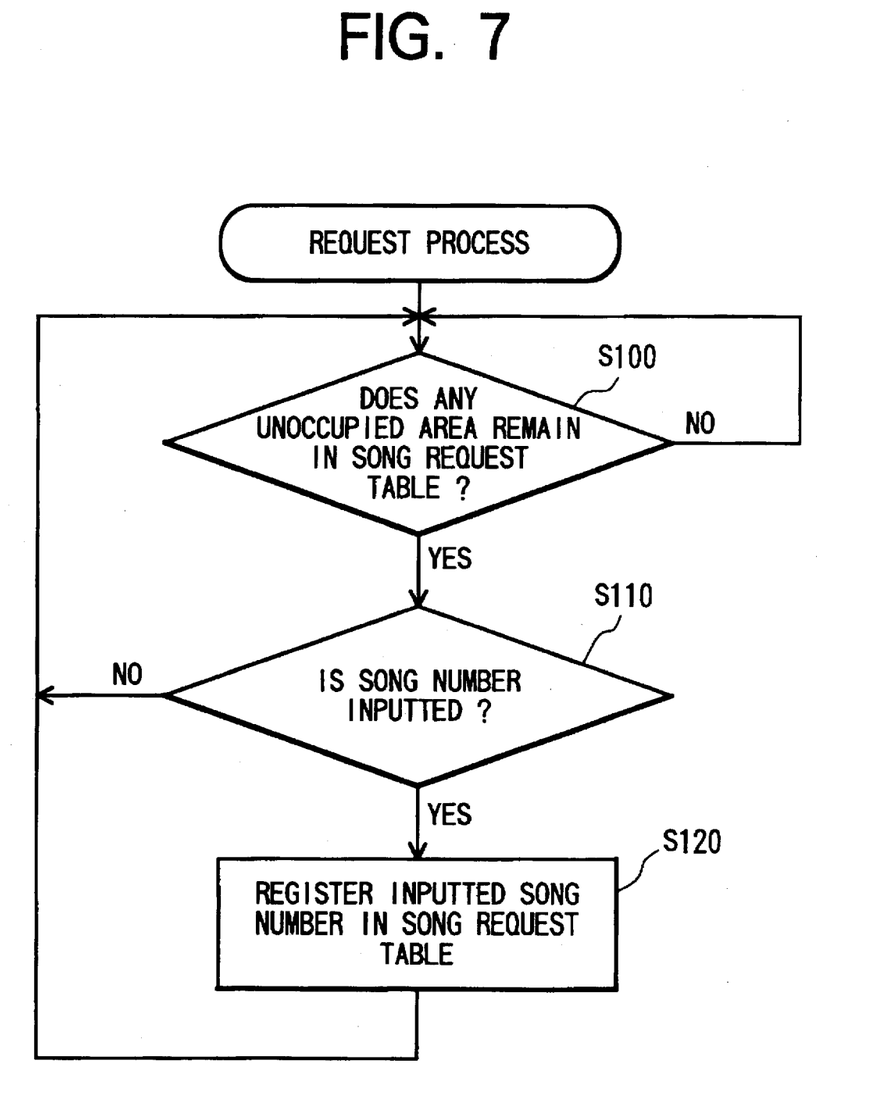
FIG. 7 is a flowchart of a request process of the first and second embodiments.
Figure 8:
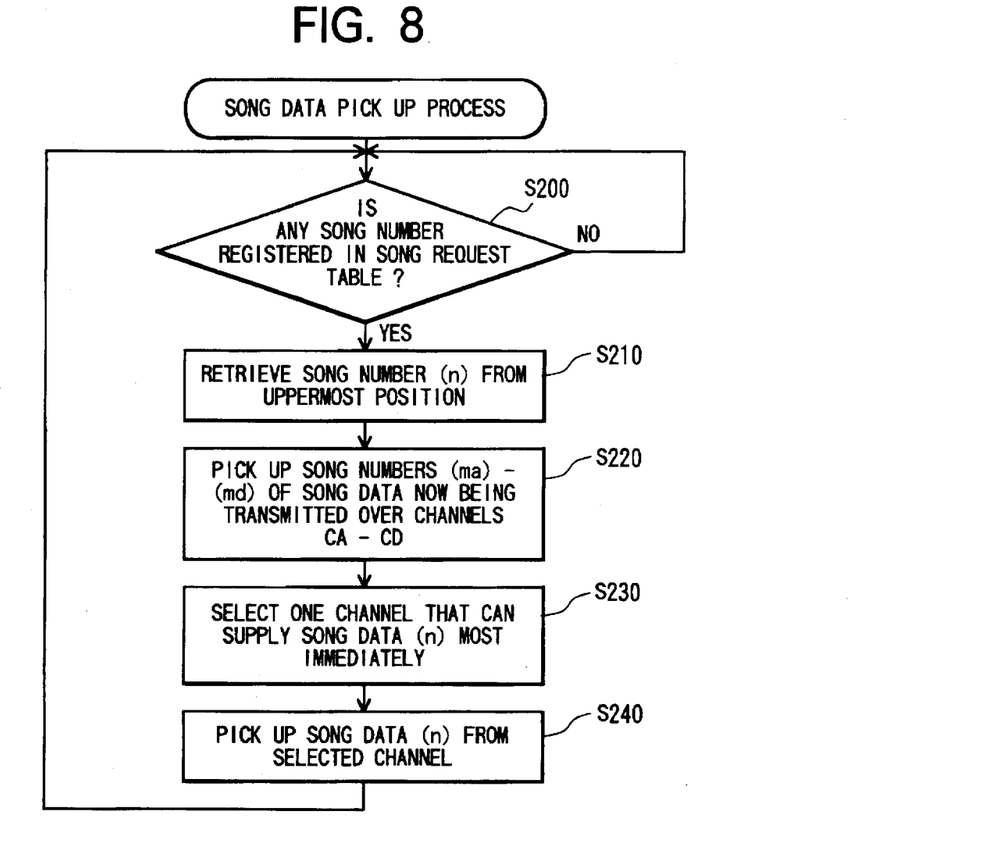
FIG. 8 is a flowchart of a song data pick up process of the first embodiment.
Figure 9:
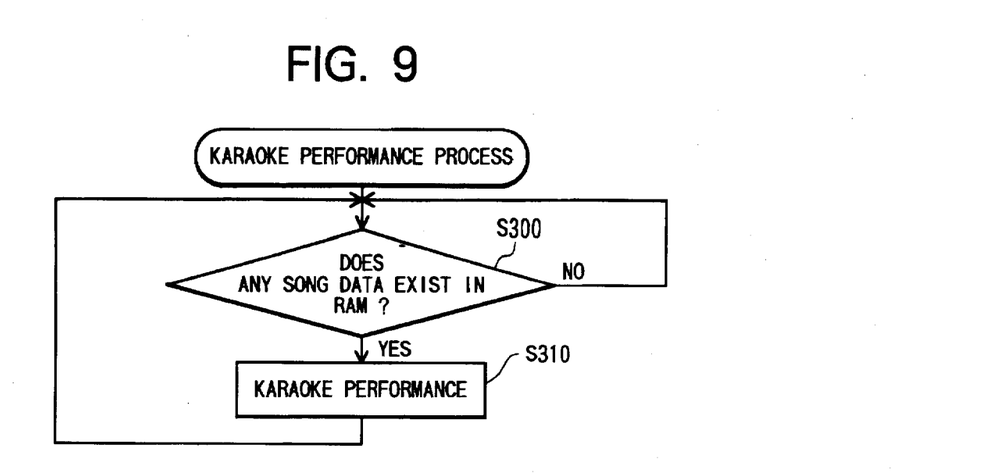
FIG. 9 is a flowchart of a karaoke performance process of the first and second embodiments.

The ROM 63 prestores various programs, including a request process routine of FIG. 7, a song data pick up process routine of FIG. 8, and a karaoke performance process routine of FIG. 9. The CPU 61 is for performing overall control of the karaoke terminal 5. The CPU 61 executes the process routines of FIGS. 7–9.

The RAM 65 is for temporarily storing karaoke song data of the requested song which has been transmitted from the center 3 through the channels CA–CD.

The RAM 65 also previously stores therein song name/ song genre information data indicating what type of song each of a plurality of songs requestable by the input device 43 corresponds to. In this concrete example, the song name/song genre information data indicates the song genre (i.e., Japanese ballads (Enka) or popular songs) each requestable song corresponds to.

The RAM 65 is further formed with a song request table for storing song numbers of the user's requested songs inputted by the input device 43. The song request table can store six song numbers at maximum. In the request process of FIG. 7 at S120 as will be described later, a song number newly-inputted from the input device 43 is registered in the song request table at the uppermost open position, as viewed in FIG. 5. In the song data pick up process of FIG. 8 at S210 also as will be described later, a song number registered in the uppermost position is retrieved from the song request table, and the song data corresponding to the song number is picked up from the appropriate channel. Song numbers remaining in the table are shifted upward.

The terminal modem 57 is for receiving and demodulating the song data transmitted from the center 3 over channels CA–CD. The modem interface 69 is for transferring the demodulated song data to the RAM 65 where the song data will be temporarily stored.

The video tuner 59 is for receiving the background image signals transmitted from the center 3 over the channels CE and CF. The video tuner 59 is controlled by the CPU 61 to select either one of the channels CE and CF to receive background image signals corresponding to the song genre of the requested karaoke song.

A microphone 71 is provided with each terminal 5 to produce a singing voice signal when a user sings into the microphone 71.

The sound source (synthesizer sound source) 45 is for converting the MIDI data (accompaniment data), included in the song content data D5 of FIG. 2 into a karaoke accompaniment signal.

The amplifier 47 is for receiving both the karaoke accompaniment signal from the sound source 45 and the singing voice signal from the microphone 71. The amplifier 47 mixes the karaoke accompaniment signal and the singing voice signal, amplifies the mixed signal, and outputs it to the speaker 49.

The image composition circuit 51 converts lyric data, also included in the song content data D5, into a lyric image signal, superimposes the lyric image signal onto a background image signal inputted from the video tuner 59, and outputs those superimposed signals to the monitor television 53.

With the above-described structure, the center 3 transmits song data, as described below.

In the center 3, each of the four data transmission devices 15a, 15b, 15c, and 15d retrieves all the songs stored in the song data base 13 in succession, and transmits them to the terminals 5 over the corresponding channel. After once transmitting all songs, each data transmission device again retrieves and transmits songs starting with song number 1. Thus, song data are cyclically transmitted to the terminals over each of the four channels CA–CD with a predetermined time cycle corresponding to the total number K of song data.

In order to perform this operation, the CPU 23 retrieves karaoke song data of all the songs from the hard disk 26 in succession. The CPU 23 then transfers the retrieved karaoke song data, via each of the modem interfaces 27a–27d, to the corresponding data transmission modem 28a –28d, where the song data are successively modulated into corresponding channel signals. The modulated karaoke song data are then successively transmitted to the karaoke terminals 5 via the head end 25 and the corresponding channel. When transmission of all the songs is completed, transmission from the first song is repeated. Thus, the songs are repeatedly or cyclically transmitted to the terminals via each channel.

Figure 6:
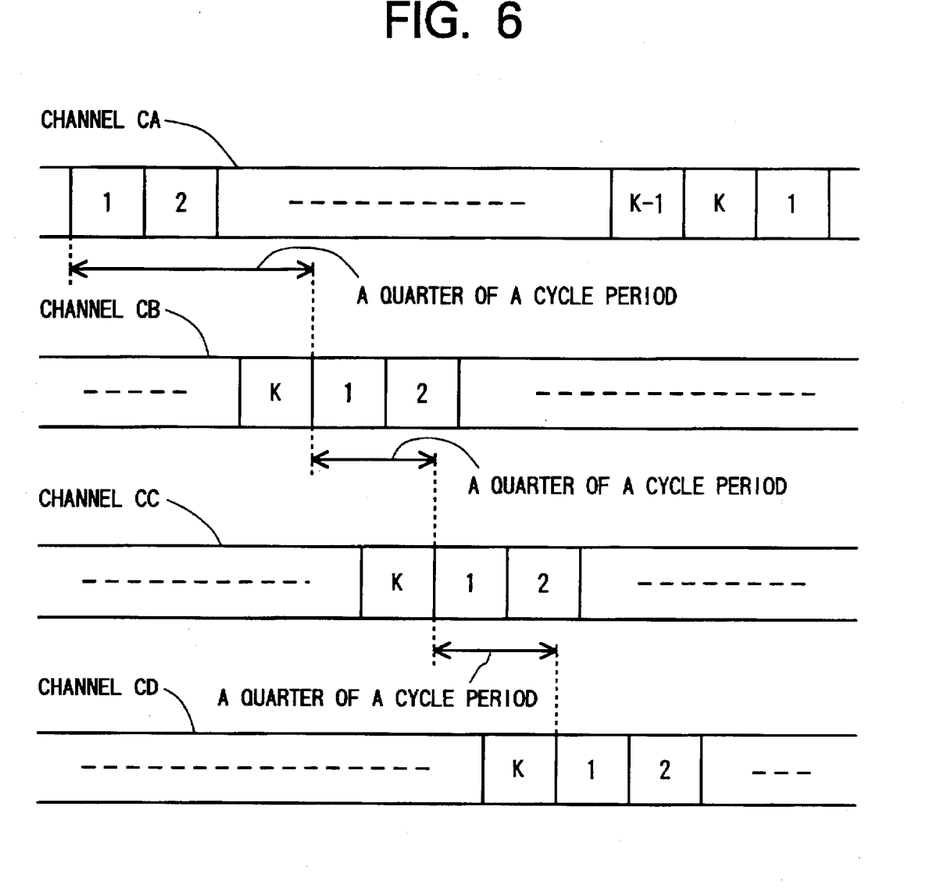
FIG. 6 illustrates how song data are cyclically transmitted through channels CA–CD according to the first embodiment.

According to the present embodiment, the four transmission devices 15a, 15b, 15c and 15d cyclically transmit all the song data from number 1 to number K at the predetermined time cycle, at the timings as shown in FIG. 6. The four transmission devices transmit the song data at timings shifted from one another by a quarter of the time cycle. The second transmission device 15b is delayed by one-quarter of the time cycle after the first transmission device 15a, the third transmission device 15c is delayed by one-quarter of the time cycle after the second transmission device 15b, and the fourth transmission device 15d is delayed by one-quarter of the time cycle after the third transmission device 15c. If K is 100, for example, the song data being transmitted over the channels CA–CD are shifted by 25 songs' worth of song data from one another. While song data of the song number 100 is being transmitted over channel CA, song data of song numbers 75, 50, and 25 are being transmitted over channels CB, CC, and CD, respectively.

In each terminal 5, a user requests a song desired to be sung, whereupon the terminal 5 picks up song data for the requested song from an appropriate one of the channels CA–CD, and starts the karaoke performance. The sequence of operations is constructed from the request process of FIG. 7, the song data pick up process of FIG. 8, and the karaoke performance process of FIG. 9, which are all being continuously executed by the CPU 61 whenever power of the terminal 5 is ON.

The request process will be first described below, with reference to FIG. 7.

In the request process, the CPU 61 first judges whether any unoccupied area remains in the song request table in the RAM 65, in step (referred to as simply "S" hereinafter) 100. When unoccupied area remains in the song request table, the program proceeds to S110, where the CPU 61 judges whether or not a song number has been inputted to the input device 43. When a song number has been inputted, the inputted song number is registered in S120 at the uppermost open location of the song request table. The program then returns to S100. On the other hand, if no song number has been inputted to the input device 43, the program returns to S100, whereupon S100 and S110 are repeated.

The song data pick up process will be described below with reference to FIG. 8. The song data pick up process is characteristic to the present embodiment.

As shown in FIG. 8, the CPU 61 first judges, in S200, whether or not any song number is registered in the song request table. If some song number is registered in the table (i.e., Yes in S200), the song number (n, for example) registered in the uppermost position of the table is retrieved therefrom, in S210.

Then, in S220, the song number data D3 is retrieved from the song data that is presently being transmitted to the terminal over channels CA–CD. (The song numbers of those song data will be referred to as "presently-transmitted song numbers (ma), (mb), (mc), and (md)" hereinafter.) S230 then determines which of the four channels CA–CD will most quickly supply the desired song data of the requested song number (n). In S230, the CPU 61 calculates differences between the requested song number (n) and the four presently-transmitted song numbers (ma), (mb), (mc), and (md), and then compares the differences with one another. Based on the differences, the CPU determines which one of the four channels CA–CD can most rapidly supply the requested song data. Then, in S240, the karaoke terminal 5 picks up the song data of the requested song number (n) from the determined channel. In order to pick up the requested song data, the CPU 61 controls the terminal modem 57 to properly receive transmission of the determined channel. The CPU 61 refers to the song number data D3, included in each of the song data serially transmitted over the channel. When the song data with song number data D3 for the requested song number (n) arrives, the CPU 61 picks up the song data. The picked up song data is transferred via the modem interface 69 into the RAM 65 where the song data is temporarily stored.

The karaoke performance process will be described below with reference to FIG. 9.

As shown in FIG. 9, the CPU 61 first judges whether or not any song data picked up by the song data pick up process is stored in the RAM 65, in S300. If some song data is stored in the RAM 65, the CPU 61 retrieves the song data from the RAM 65, based on which a karaoke performance is started in S310. After the performance ends, the program returns to S300.

In the karaoke performance process, the CPU 61 supplies the image composition circuit 51 with the lyric data included in the song data retrieved from the RAM 65. The CPU 61 supplies the sound source 45 with the MIDI data also included in the song data.

The CPU 61 refers to the song name/song genre information data stored in the RAM 65 so as to determine the song genre of the requested song with the song number (n). Then, the CPU 61 controls the video tuner 59 to switch to the channel over which a background image signal corresponding to the genre of the requested song is being transmitted. The background image signal received by the video tuner 59 is supplied into the image composition circuit 51.

The image composition circuit 51 converts the received lyric data into a lyric/image signal, and superimposes the lyric/image signal onto the background image signal. Receiving those superimposed signals, the monitor television 53 displays characters of the lyrics superimposed on the background image.

The sound source 45 converts the received MIDI data into an accompaniment signal, and inputs the signal to the amplifier 47. The amplifier 47 mixes the accompaniment signal with the voice signal from the microphone 71 as sung by a user, amplifies those signals appropriately, and outputs them to the speaker 49.

As described above in the first embodiment, the four data transmission devices 15a–15d cyclically transmit the same total K number of song data via their corresponding channels CA–CD at timings shifted from one another by a quarter of the cycle period. A karaoke terminal 5 first determines through which of the four channels the requested song data will first appear. Then, the karaoke terminal 5 picks up the requested song data from the determined channel.

The same K-number of song data are transmitted through the four channels CA–CD, such that they are shifted by the number of the song data of a quarter of the number K. Each terminal can therefore pick up desired song data within only a quarter of a waiting period that will be required if the total K number of song data were transmitted via a single channel.

Because the same song data are transmitted over the four channels, even if any transmission over one of the channels is interrupted, transmission can be continued through other channels.

Figure 10:
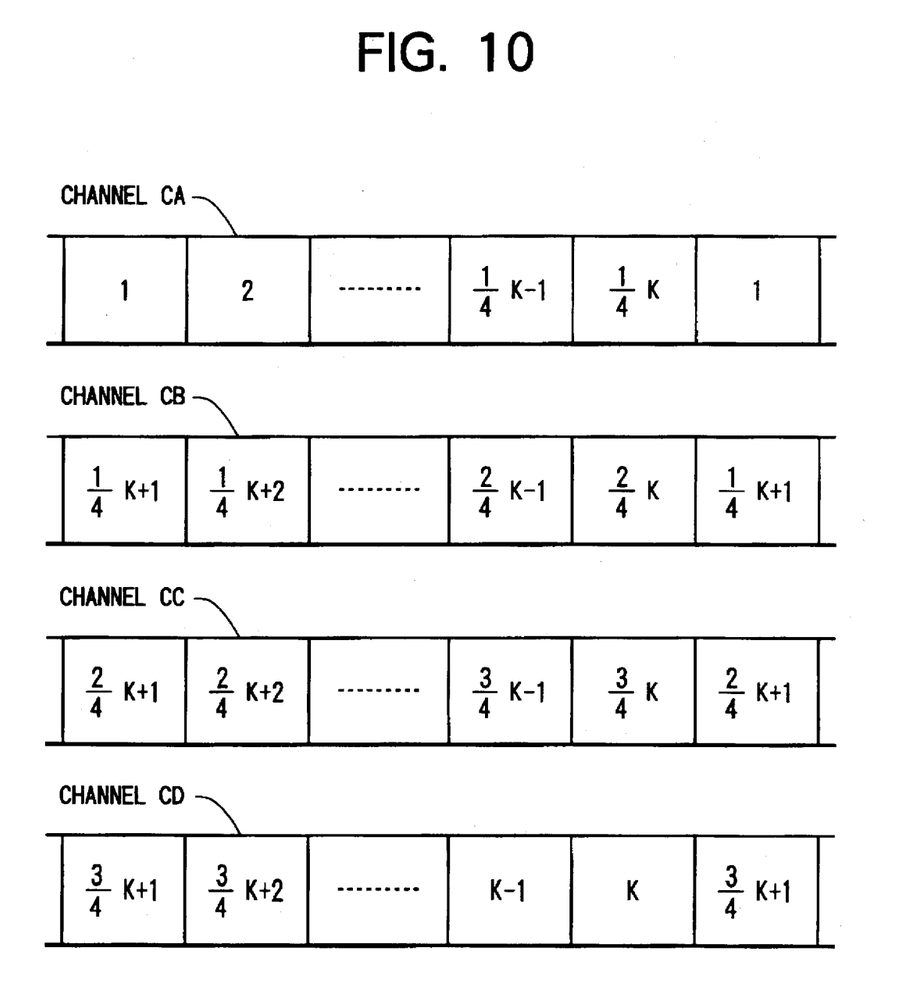
FIG. 10 illustrates how song data are cyclically transmitted through channels CA–CD according to the second embodiment.
Figure 11:
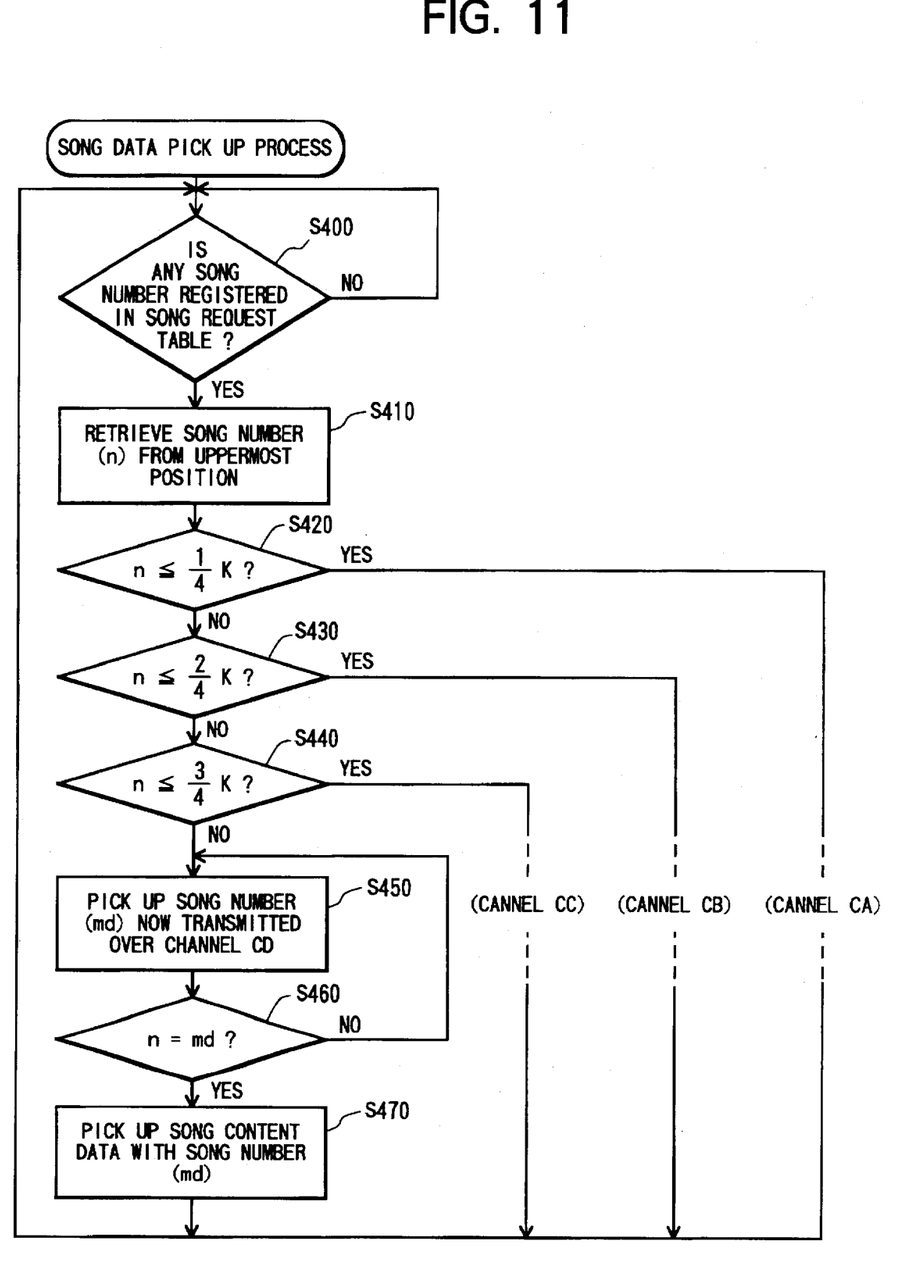
FIG. 11 is a flowchart of a song data pick up process of the second embodiment.

A second embodiment will be described below with reference to FIGS. 10 and 11.

Though the first embodiment transmits the same K number of song data via the four channels, the second embodiment divides the K number of song data into four groups which are allotted to the four channels, respectively. As shown in FIG. 10, song data with song numbers 1 through (K/4) are cyclically transmitted by the first data transmission device 15a via channel CA; song data with song numbers {(K/4)+1} to (K/2) by the second data transmission device 15b via channel CB; song data with song numbers {(K/2)+1} to (3K/4) by the third data transmission device 15c via channel CC; and song data with song numbers {(3K/4)+1} to K by the data transmission device 15d via channel CD. For example, when K is 100, the data transmission devices 15a–15d transmit song data with song numbers 1–25, 26–50, 51–75, and 76–100, respectively.

Because each data transmission device 15 cyclically transmits a quarter amount of the total song data, the cycle time required for transmitting song data in one turn is merely a quarter of a time cycle required if total song data were transmitted by only one channel.

The structure of the karaoke system of the present embodiment is the same as that of the first embodiment, except that the song data pick up process of FIG. 8 is replaced with that of FIG. 11 which will be described below.

In the same manner as that of the first embodiment, S400 first judges whether or not any song number is registered in the request song table. If some song number is registered in the table (i.e., Yes in S400), song number (n) registered in the uppermost position of the table is retrieved in S410.

Then, S420, S430, and S440 are performed for judging which one of the four channels CA–CD can supply the song data of the song number (n). That is, S420 judges whether or not the number (n) falls in the range of 1 to (K/4), S430 judges whether or not the number (n) falls in the range of {(K/4)+1} to (K/2), and S440 judges whether or not the number (n) falls in the range of {(K/2)+1} to (3K/4).

The description given below assumes that the number (n) falls in the range of {(3K/4)+1} to K. Therefore, it is determined by determinations of S420, S430 and S440 (i.e., "NO" in S420, S430 and S440) that the song data of the song number (n) will be transmitted via the channel CD. Accordingly, S450 is first executed to pick up from the channel CD the song number (md) of song data that is presently being transmitted via channel CD. Then, S460 judges whether the song number (md) matches the song number (n). When the song number (md) does not match the song number (n), the program returns to S450. The song number (md) of the song data that is being next transmitted is again picked up from channel CD and compared with the song number (n). Thus, the steps S450 and S460 are repeated until the picked up song number (md) matches the song number (n).

When the retrieved song number (md) matches the song number (n) (i.e., Yes in S460), the song content data with that song number is picked up from the channel and stored in the RAM 65. Then, the program returns to S400.

When the song number (n) falls in the range of 1 to (K/4), the song data of the song number (n) is picked up from the channel CA, by processes similar to those represented by S450–S470. When the song number (n) falls in the range of {(K/4)+1} to (K/2), the song data of the song number (n) is picked up from the channel CB, by processes similar to those represented by S450–S470. When the song number (n) falls in the range of {(K/2)+1} to (3K/4), the song data of the song number (n) is picked up from the channel CC, by processes similar to those represented by S450–S470.

As described above, according to the second embodiment, (K/4) number of song data are transmitted over each channel. Because one quarter of all the song data (i.e., K/4) is transmitted over each channel, the karaoke terminal 5 can pick up desired data within a short period of time, as in the first embodiment. In other words, the karaoke terminal 5 can obtain desired song data after waiting for a maximum of (K/4)-number of song data to pass. In this case, similar to the first embodiment, it is possible to shorten the waiting time required for obtaining desired song data to a quarter of the waiting time required if all (K) song data is transmitted over a single channel.

It is preferable to cyclically transmit song data over the four channels with the same cycle periods. In the above description, therefore, the total (K) number of song data are equally divided into four groups allotted to the four channels. It is noted, however, that amounts or lengths of song data of respective songs are slightly different from one another. Accordingly, the total (K) number of song data can be unequally divided into four groups so as to adjust the numbers of song data transmitted over the respective channels, thereby equalizing the time cycles required at the respective channels.

In the above-described second embodiment, the total (K)-number of song data are arranged successively from song number 1 to song number K, and then divided into four groups of: 1 to K/4, K/4+1 to K/2, K/2+1 to 3K/4, and 3K/4+1 to K. The four groups are allotted to the four channels. However, other various methods can be employed for dividing the song data into four groups. For example, when the song number of each song data is divided by four, the remainder will be either 0, 1, 2, or 3. Each song can be allotted to either one of four groups based on the value of the remainder. That is, song data with song numbers 4, 8, 12, ... that will have no remainder (zero) are transmitted over the channel CA; song data with song numbers 1, 5, 9, ... that will have a remainder of one are transmitted over the channel CB; song data with song numbers 2, 6, 10, ... that will have a remainder of two are transmitted over the channels CC; and song data with song numbers 3, 7, 11, ... that will produce a remainder of three are transmitted over the channel CD.

As described above, according to the one-way data transmission system of the present invention, it is possible to shorten the time period required for obtaining desired song data, in comparison with the case wherein all song data are transmitted over a single channel. The time period can be shortened to a length of 1/(the number of used channels) of the time period required when only a single channel is used.

While the invention has been described in detail with reference to specific embodiments thereof, it would be apparent to those skilled in the art that various changes and modifications may be made therein without departing from the spirit of the invention, the scope of which is defined by the attached claims.

For example, the present invention is not limited to application to a karaoke system but can also be applied to systems for providing various types of information such as weather reports and traffic information. Various methods can be provided to allot the information to several channels. For example, weather informations for several local regions can be allotted to several channels.

What is claimed is:

1. A data transmission device comprising:
   a central control unit; and
   a plurality of terminals connected to the central control unit via a transmission line, the transmission line having several channels for transmitting information data,
   wherein the central control unit includes:
      information data memory means for storing a plurality of information data; and
      several data transmission means each for successively transmitting the plurality of information data via a corresponding channel of the transmission line cyclically at a predetermined cycle period, the transmission timings at which the several data transmission means transmit the information data being shifted from one another by a time period obtained by dividing the predetermined cycle period with the number of channels; and
   wherein each of the plurality of terminals includes:
      channel determination means for determining one channel of the several channels, over which a desired information data will be transmitted at a desired timing; and
      data pick up means for picking up the desired information data from the determined channel.

2. A data transmission device of claim 1, wherein each of the plurality of terminals further includes input means for inputting request of the desired information data.

3. A data transmission device of claim 2, wherein the channel determination means includes:
   data confirming means for confirming information data that are being presently transmitted over the respective channels; and
   time presumption means for presuming a time period required until the desired information data will be transmitted over the respective channels.

4. A data transmission device of claim 3, wherein the plurality of information data are numbered with consecutive data numbers, the data confirming means confirming the data numbers of information data that are being presently transmitted over the respective channels, wherein the time presumption means includes calculation means for calculating the differences between the data number of the desired information data and the data numbers confirmed by the data confirming means.

5. A data transmission device of claim 1, wherein the several data transmission means successively transmit the same plurality of information data via the corresponding channels cyclically at the shifted timings so that the several channels supply the plurality of terminals with each information data at the shifted timings, the channel determination means determining one channel that will transmit the desired information data at the desired timing.

6. A data transmission device of claim 5, wherein each of the plurality of terminals further includes input means for inputting request of a desired information data, and wherein the channel determination means determines one channel of the several channels that will transmit the desired information data within the shortest time period from when the request of the desired information data is inputted.

7. A data transmission device of claim 6, wherein the input means includes:

request receiving means for receiving the request of the desired information data;

data storage means for storing request data indicative of the desired information data; and data judging means for judging whether the request data is stored in the data storage means, the data judging means controlling, when the data judging means judges that the request data is stored in the data storage means, the channel determination means to determine one channel that will transmit the desired information data within the shortest time period from when the data judging means judges that the request data is stored in the data storage means.

8. A data transmission device of claim 7, wherein the channel determination means includes:

data confirming means for confirming information data that are being presently transmitted over the respective channels; and time presumption means for presuming a time period required until the desired information data will be transmitted over the respective channels.

9. A data transmission device of claim 8, wherein:

the plurality of information data are numbered with consecutive data numbers, the data confirming means confirming the data numbers of information data that are being presently transmitted over the respective channels; and the time presumption means includes calculation means for calculating differences between the data number of the desired information data and the data numbers confirmed by the data confirming means.

10. A data transmission device comprising:

a central control unit; and a plurality of terminals connected to the central control unit via a transmission line, the transmission line having several channels for transmitting information data, wherein the central control unit includes:

information data memory means for storing a plurality of information data, the plurality of information data being divided into several information data groups, each of the information data groups consisting of several information data; and several data transmission means each for successively transmitting the several information data of a corresponding information data group via a corresponding channel of the transmission line cyclically; and wherein each of the plurality of terminals includes:

channel determination means for determining one channel of the several channels, over which a desired information data will be transmitted; and data pick up means for picking up the desired information data from the determined channel.

11. A data transmission device of claim 10, wherein each of the plurality of terminals further includes input means for inputting request of the desired information data.

12. A data transmission device of claim 11, wherein the plurality of information data are numbered with consecutive data numbers, the plurality of information data being divided into the several information data groups, the number of which is equal to the number of the channels, each of the plurality of information data is allotted to one of the several information data groups, according to the relationship between the corresponding data number and the number of channels.

13. A data transmission device of claim 12, wherein each of the plurality of information data is allotted to one of the several information data groups, according to a remainder obtained by dividing the corresponding data number with the number of channels.

* * * * *